Jan. 1, 1952  R. B. BROWN  2,580,993
WEIGHING MACHINE
Filed Oct. 20, 1948  4 Sheets-Sheet 1

INVENTOR.
ROBERT B. BROWN
BY
ATTORNEY

Jan. 1, 1952  R. B. BROWN  2,580,993
WEIGHING MACHINE
Filed Oct. 20, 1948  4 Sheets-Sheet 2

INVENTOR.
ROBERT B. BROWN
BY
ATTORNEY

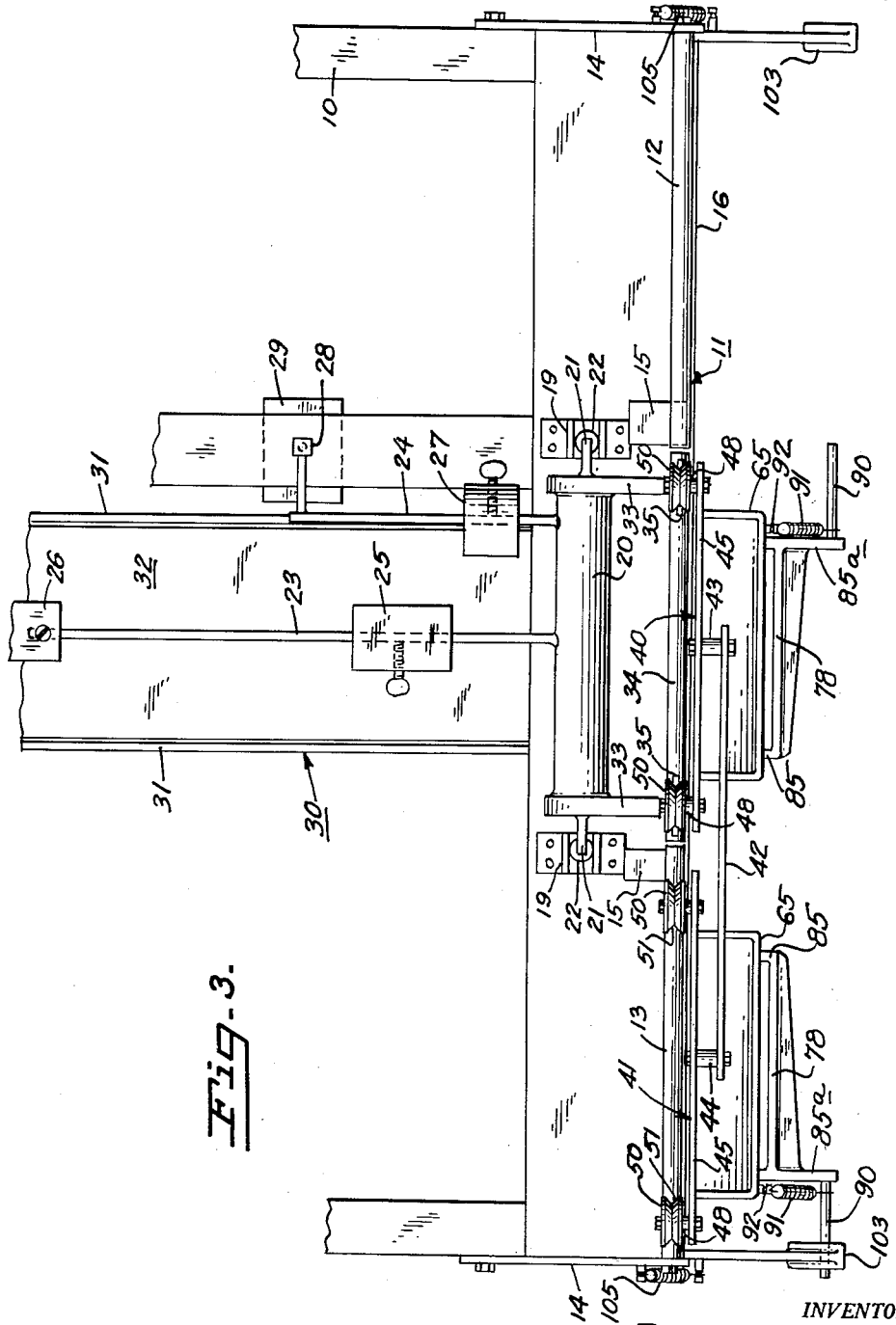

Jan. 1, 1952 — R. B. BROWN — 2,580,993
WEIGHING MACHINE
Filed Oct. 20, 1948 — 4 Sheets-Sheet 4
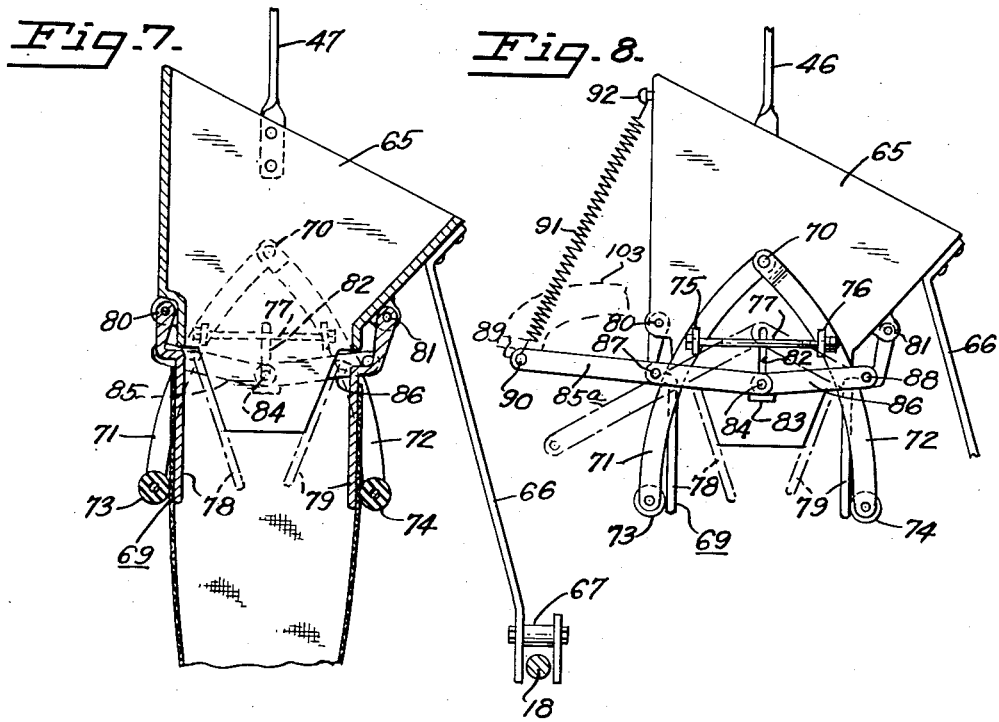
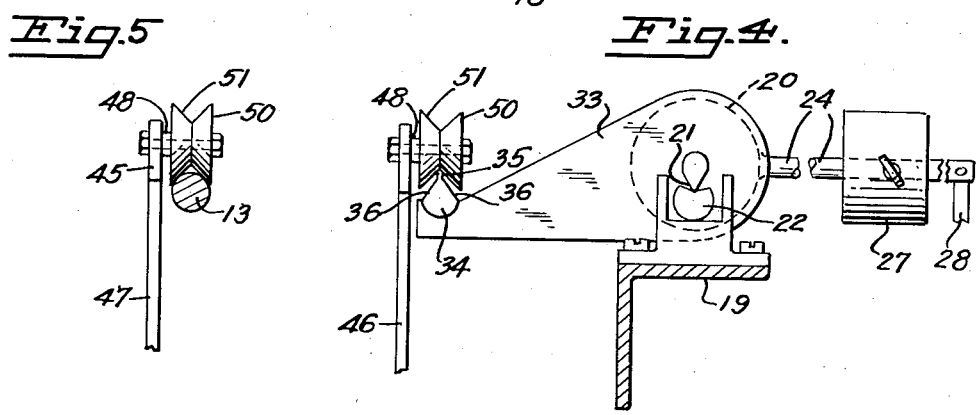
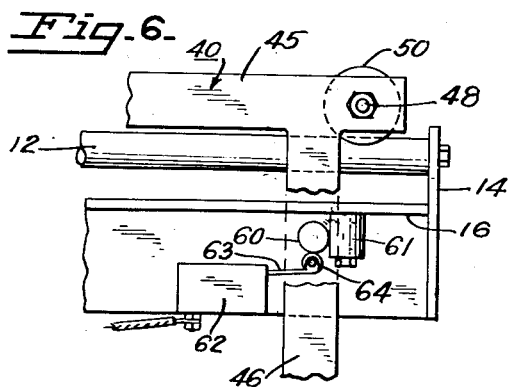
INVENTOR.
ROBERT B. BROWN
BY
ATTORNEY Patented Jan. 1, 1952

2,580,993

UNITED STATES PATENT OFFICE 2,580,993

WEIGHING MACHINE

Robert B. Brown, San Francisco, Calif., assignor to T. R. Mantes, doing business as T. R. Mantes Co., San Francisco, Calif.

Application October 20, 1948, Serial No. 55,617

9 Claims. (Cl. 249—56)

This invention relates to a loading and weighing machine. More particularly the invention relates to a machine for filling containers with a predetermined weight of material. Still more particularly, it relates to a machine having a single weighing mechanism and a pair of container-supporting, shiftable carriages arranged side by side, so that while a container held by one carriage is being filled, a filled container held by the other carriage, may be removed and replaced by an empty container.

One problem which this invention solves is that of speeding up the operation of packaging a number of containers, filling each with a predetermined weight of material. In the conventional filling machines time is lost in removing the full container from the holding mechanism and replacing it with an empty one, because during this time there is no weighing or filling operation going on.

One object of the invention is to provide an improved machine for filling a series of containers with a like weight of material.

Another object of the invention is to provide a filling machine in which there are two container-holding mandrels, so that one container may be filled while a full container is being replaced with an empty one.

Another object of the invention is to provide a bag loading and weighing machine in which a minimum of time is lost while full bags are being replaced by empty bags.

Another object of the invention is to provide an improved container-filling machine in which there is a positive control for assuring positioning of the containers.

Another object of the invention is to provide a bag weighing and loading machine having a novel foot pedal control for the bag holding clamp.

Other objects and advantages of the invention will appear from the following description of a specific machine embodying the principles of the invention. In accordance with U. S. Revised Statutes, section 4888, the machine is described in detail, but it should be understood that this detailed description is given in order to comply with the statute and is not intended to narrowly restrict the claims. For example, many of the principles of the invention are applicable to machines for filling other kinds of containers than bags, but only a bag-filling machine is illustrated.

In the drawings:

Fig. 3 is an enlarged plan view of the machine;

Fig. 4 is a view in section along the line 4—4 in Fig. 1;

Fig. 5 is a view in section along the line 5—5 of Fig. 1;

Fig. 6 is an enlarged view of the device used for positioning the carriages and for activating the filling mechanism;

Fig. 7 is an enlarged view in section of the bag-holding clamp showing it in closed (bag holding) position in solid lines, and in open position in dotted lines, and;

Fig. 8 is a view in side elevation of the bag holding clamp showing it in closed (bag-holding) position in solid lines and showing in dotted lines the clamp in its open position.

Figure 1:
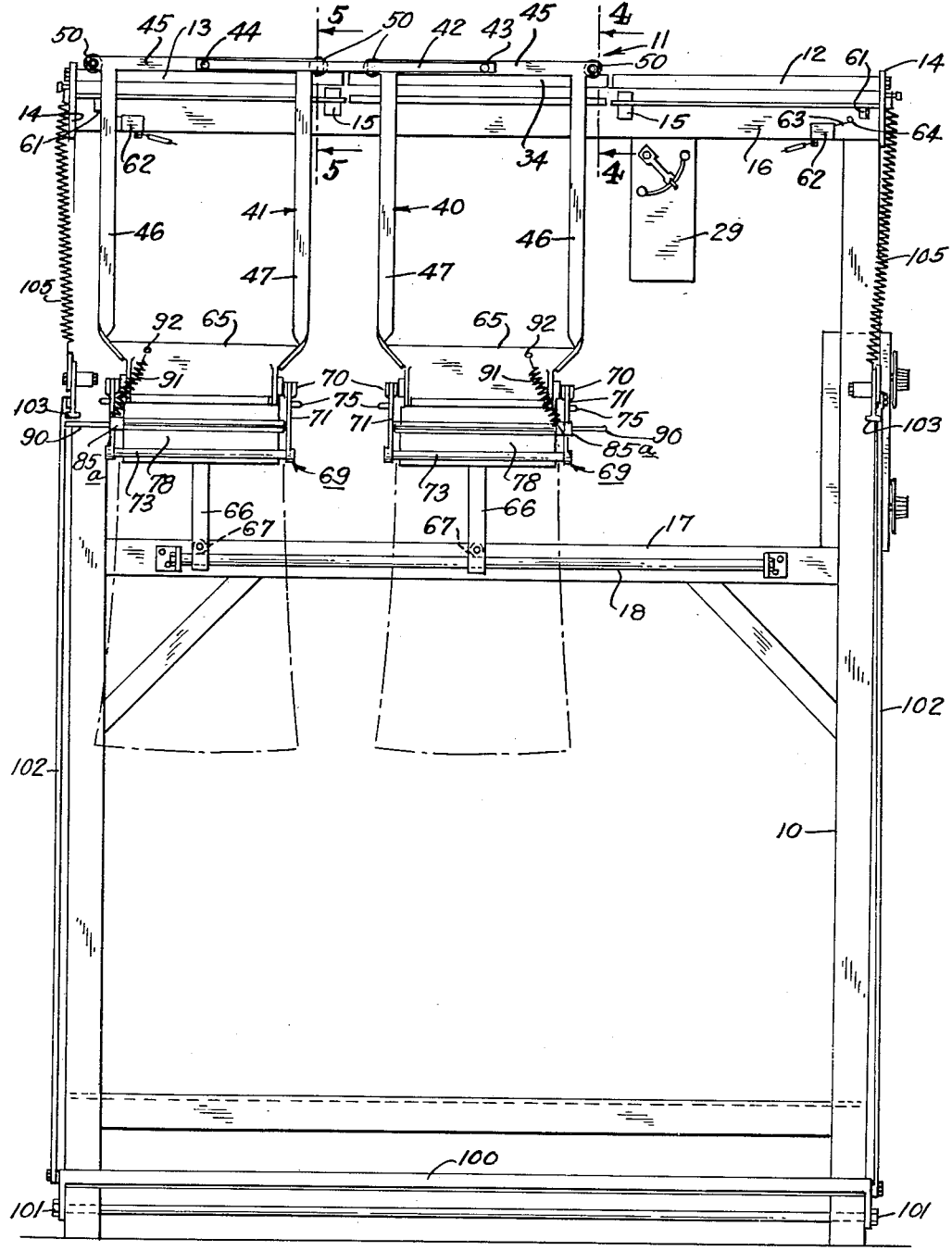
Fig. 1 is a view in front elevation of a machine embodying the principles of the invention.

The packaging machine of this invention comprises a frame which supports a horizontal track at its upper end. The track is made in three sections: the two outer sections are stationary, but the center section is secured directly to the scale beam and is free to move relatively to the other two sections. A pair of carriages, pivotally linked in tandem, are mounted on rollers which are adapted to move along the track. These carriages each support a clamp for holding a container and are so adapted that when one of them is in the filling and weighing position, the other is at one side where a loaded container may be replaced with an empty one. There are positive controls to insure the proper positions and a pedal control for releasing the container from its clamp.

The drawings disclose a bag weighing and filling machine, all of which is supported by a frame 10. At the upper end of the frame 10 is a horizontal track 11, whose outer sections 12 and 13 are stationary round rods secured firmly by brackets 14 and 15, fixed to the frame 10 adjacent an angle-iron crossbar 16. Brackets on a second cross bar 17, below the bar 16, support a fixed rod 18, which serves to steady the bag carriages 40 and 41, in a manner explained below. Back of the bar 16 and approximately level with it are a pair of frame members 19 which support the balance mechanism (see Figs. 3 and 4). The scale beam 20 includes a pair of knife edges 21 which rest on a bearing 22 of agate or some similar material. To one side of the beam 20 is secured a main counterbalance bar 23 and a secondary counterbalance bar 24. A main counterweight 25 rides on the main counterbalance bar 23, and serves to adjust the weight of the contents of each bag filled. A limit stop 26 secured to the frame 10 adjacent the end of the bar 23 limits the swing of the balance.

The secondary counterbalance bar 24 serves two purposes. It has a counterweight 27 which is used to adjust the balance to compensate for the weight of the carriage assembly and the bag. It also has a connecting rod 28 which actuates a scale control mechanism 29 to stop feeding when a bag is full. The scale control mechanism may be of conventional type or may be the improved device shown in applications Nos. 681,660, filed July 6, 1946, which is now held abandoned, and 783,399, filed October 27, 1947. In essence it may comprise an electrical switch mechanism set in an electrical circuit with a feed mechanism 30. When the switch is closed (in a manner subsequently described), the feed mechanism is operated until the predetermined weight is reached. Then, when the scale beam swings, the bar 24 swings up, and the connecting rod 28 acts to open the switch. The feed mechanism is then stopped until the switch is again closed.

The feed mechanism comprises a feed chute 31, supported below the scale by the frame 10, and a conveyor belt 32. The belt 32 is of familiar design and moves inside the chute 31 to carry material from a storage hopper (not shown) to the feed hoppers 65 which load the bags. The motor may be adapted to drive the feed mechanism at two rates of speed—a fast-feeding rate for the early part of each feeding operation and a dribble rate at the end. The scale control means 29 may then not only control the starting and stopping of the belt, but also its change of speed.

To the other side of the beam 20 from the counterbalances, a pair of levers 33 are secured. These support a round rod 34, which is also the center section of the track 11. It has knife edge sections 35 adjacent each end, and below these knife edges it is beveled at 36, to permit the rollers to swing, supported only by the knife edge 35.

The container-holding mechanism comprises two carriages 40 and 41 linked in tandem by a bar 42. The bar 42 is pivotally secured to each carriage at 43 and 44, so that although the carriages move together horizontally across the track, they are free to swing a small vertical distance with respect to each other. Thus when one carriage is in the weighing position, the bar 42 adds to it only an inconsiderable and fixed amount which may be compensated for when the scale is first set.

Each carriage 40, 41 comprises a top bar 45 and two depending side bars 46 and 47. Stub shafts 48 secured to the top bar 45 support the rollers 50 for free rotation. Each roller 50 has a V groove at 51, the groove being so proportioned to the track 11 and knife edges 35 that the carriages 40, 41 are not lifted nor lowered when the rollers pass from the round to the knife portions of the rods 34. When the rollers 50 are at rest on the knife edges 35, there is sufficient clearance at the bevels 36, so that the carriage will hang free during the weighing operation.

A free running roller 60 is mounted on the inner edge of each of the outside vertical bars 46 and serves to actuate the feed mechanism and to reset the control switch 29. (See Fig. 6.) At each end of the frame 10 a stop member 61 depends from the top cross bar 16. Adjacent to it is secured a switch 62 having a spring switch actuator element 63 with a roller 64 at the end of the spring. When either carriage is moved to the side of the frame 10, its actuator roller 60 comes against its stop 61 and prevents further movement of the carriage tandem 40, 41. Also the roller 60 contacts the roller 64, thus depressing the spring 63 and closing the switch 62. The switch 62 then activates the automatic feed mechanism 30 and scale control 29 so that material is immediately fed into the container supported on the other carriage.

The hoppers 65 are supported by the vertical bars 46 and 47. When the roller 60 on one carriage engages the stop 61, the hopper 65 of the other carriage is in the central filling and weighing position adjacent the end of the chute 31. As shown in Figs. 7 and 8, the hoppers 65 are tilted toward the feed chute 31. Rigidly secured to the side of each hopper 65 adjacent the frame 10 is a bar 66, at the lower end of which is a pronged steady member 67. The member 67 fits over the bar 18 and limits the swinging of the carriages 40, 41. There is sufficient clearance vertically and sidewise to allow the amount of swinging necessary for accurate weighing.

At the bottom of each hopper 65 is a clamp 69. (See Figs. 7 and 8.) A pin 70 at each side of the hopper 65 pivotally secures to each side a pair of arcuate arms 71 and 72. The arms 71 and 72 pivot on the pin 70, so that they are self centered. Between them the arms 71 and 72 support non-rotating clamp rods 73 and 74. The spacing between these rods is controlled by a threaded member 77 supported in ears 75 and 76 on the arms 71 and 72. Different sized bags may be accommodated by spreading the arms 71, 72 apart or by bringing them closer together.

Two swinging clamp members 78 and 79 are pivotally secured at 80 and 81 to the hopper 65 inside the rods 73 and 74. When these swinging members 78 and 79 are in the position shown in solid lines in Figs. 7 and 8, they are pressed tightly against the rods 73 and 74 to hold the bag. When swung in, in a manner to be described (shown in dotted lines in Figs. 7 and 8), the bag is released and a new bag may be inserted. The operation of the clamp members 78 and 79 is accomplished with the aid of a vertical guide groove 82 on each side of the hopper 65. At the bottom of each groove 82 is a stop member 83. A sliding pin 84 fits movably in the groove 82 and pivotally holds two lever arms 85 and 86. These lever arms 85 and 86 are pivotally attached at 87 and 88 to the swinging clamp members 78 and 79.

The lever arm 85a on the outside side of each clamp 69 is substantially longer than the other arms 85 and 86 and extends beyond its pivot point 87. A control stud 90 is secured at its outer extremity 89. A spring 91 is secured at one end to the stud 90 and at its other end to an anchor 92 on the hopper 65. The spring 91 forces the clamp members 78 and 79 against the rods 73 and 74 except when the stud 90 is forcibly depressed.

Figure 2:
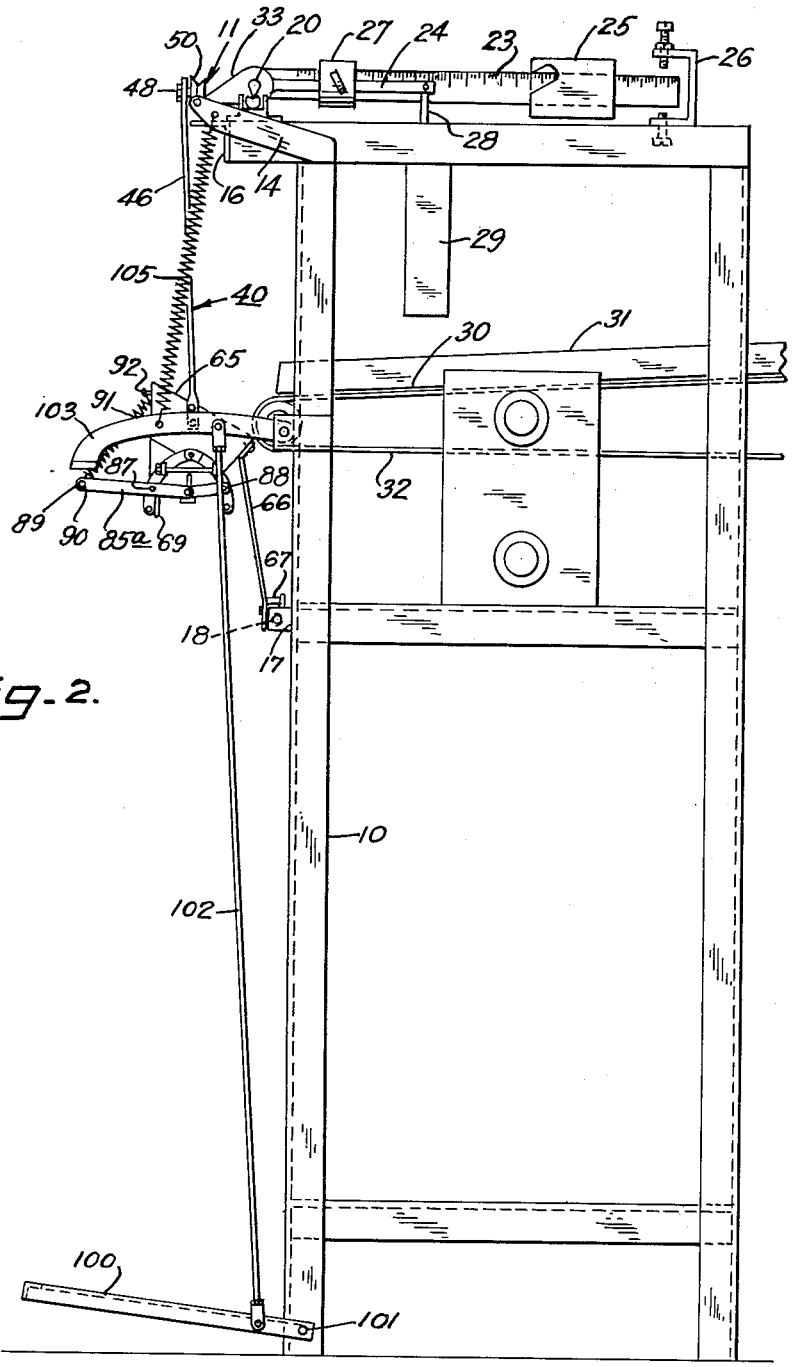
Fig. 2 is a view in side elevation of the machine.

A foot pedal 100 is pivotally secured to the frame at 101. (See Fig. 2.) Rods 102 are pivotally connected both to it and to depressor arms 103 which are themselves pivotally secured to the frame 10 at about the height of the hopper 65. A spring 105 is anchored at one end to the depressor bar 103 and at its other end to the bracket 14. The spring 105 holds the depressor arm 103 and the pedal 100 upwardly. In this position, the clamps 69 hold their bags in closed position. However, when the pedal 100 is depressed against the force of the spring 105, the depressor bars 103 are lowered, and if either of the carriages is in its side position, the depressor bar 103 will contact its stud 90. This will depress the lever 85a and will swing the clamp members 78 and 79 inwardly. Any bag held by that particular carriage is released and a new bag may be inserted. After insertion the pedal 100 is released and the clamp members 78 and 79 move outwardly to hold the bag tightly against the rods 73, 74. The other carriage, which is in weighing position, is unaffected by this operation and continues to hold its bag tightly.

The device can be operated with an automatic feeding and weighing machine. When one carriage 40 is in the position where the foot pedal 100 and depressor bar 103 can open its clamp 69, the other carriage 41 is in the weighing position with its rollers 50 resting on the knife edges 35. The movement of the roller 60 of carriage 40 against the stop 61 assures that the carriage 41 is properly aligned. At the same time the switch 62 is thrown, starting the belt 31 moving material through the chute 30. When the bag has been filled with a predetermined weight of material, the connecting rod 28 actuates the scale control mechanism 29, and the conveyor feed is cut off. The bag held by the carriage 41 is now full, and the carriages may be moved in tandem so that the full bag goes to the other end of the machine, and the empty bag placed on the carriage 40 during this weighing operation is moved into the weighing position. Then the carriage 41 carrying the full bag trips its switch 62 and the conveyor feeds into the empty bag, held by the carriage 40. The full bag on carriage 41 may be removed by depressing the pedal 100 to open the clamp 69, and an empty bag put in place. This sequence may be repeated indefinitely.

From the above description it is evident that the invention possesses great advantages over prior art devices. For one thing both hands are left free to handle the bags while opening and closing the clamp and while the weighing operation is going on. This can be done because of the arrangement of the foot pedals 100, the clamps 69, the weighing track 34, and the automatic mechanisms 29 and 30.

Another advantage of the invention is that the carriage holding the container being weighed is not interferred with in any way when the old bag is being taken off and a new bag inserted on the other carriage. This is due to the separation of the track into two outside sections 12 and 13 and the center section 34 and to the pivotal connections 43 and 44 of the bar 42 which connects the two carriages 41 and 42 together.

I claim:

1. A machine for filling and weighing a container supported by one of two carriages while simultaneously a filled container supported by the other carriage is being replaced by an empty container and in which said carriages may then be shifted so that the first-named container can be replaced with an empty container while the empty container just placed on the other carriage is being filled and weighed, comprising: a main frame; a balance supported by said frame; a central carriage track, secured to said balance and swingable therewith and adapted to support a carriage in weighing position; two fixed carriage tracks secured to said main frame collinearly on either side of said central track; a pair of container-supporting carriages movable along said tracks, joined pivotally in tandem so that at one time only one rests on said central track; and a clamp on each said carriage for holding a container.

2. The machine claimed in claim 1 in which the carriages are supported on grooved rollers, and in which the central track includes knife edges adjacent each end on which said rollers rest when in weighing position, said track being beveled below said knife edges to permit swinging.

3. A machine for filling and weighing a container supported by one of two identical carriages while simultaneously removing a filled container supported by the other carriage and replacing it with an empty container and in which said carriages may then be shifted so that the first-named container can be removed and replaced with an empty container while the empty container just placed on the other carriage is being filled and weighed, comprising: a main frame; a balance supported by said frame and including a weighing lever and an adjustable counterweight lever; a central carriage track, secured to said weighing lever and adapted to support a carriage while in weighing position; two fixed carriage tracks secured to said main frame collinearly on either side of said central track, but separated therefrom sufficiently for said central track to swing freely with said balance lever; a pair of container-supporting carriages adapted to move along said tracks, and to rest one at a time completely on said central weighing track; a tandem link, pivotally connected to each said carriage and joining them for horizontal movement across said tracks while permitting some relative vertical movement; a clamp on each said carriage for holding a container; and means on said frame for spreading said clamp so as to enable insertion and withdrawal of a container only when its carriage is entirely on one of said side tracks and the other carriage is in weighing position.

4. The machine claimed in claim 3 in which the carriages are supported on grooved rollers, and in which the central track includes knife edges adjacent each end on which said rollers rest when in weighing position, said track being beveled below said knife edges to permit swinging.

5. A machine for automatically filling and weighing a container supported by one of two carriages while simultaneously a filled container supported by the other carriage is being replaced by an empty container and in which said carriages may then be shifted so that the first-named container can be replaced with an empty container while the empty container just placed on the other carriage is being filled and weighed, comprising: a main frame; a balance supported by said frame and including a weighing lever and a counterweight lever; a central carriage track, secured to said weighing lever and adapted to support a carriage in weighing position; two fixed carriage tracks secured to said main frame collinearly on either side of said central track, but separated therefrom sufficiently for said central track to swing freely with said balance lever; a pair of container-supporting carriages movable along said tracks, so that at one time only one rests on said central track; a tandem link, pivotally connected to each said carriage and joining them for horizontal movement across said tracks while permitting some relative vertical movement; a feed hopper secured to each said carriage; a clamp on each said carriage below said feed hopper for holding a container; means on said frame for spreading said clamp so as to enable insertion and withdrawal of a container only when its carriage is entirely on one of said side tracks and the other carriage is in weighing position; feed means for automatically loading a container in said weighing position; and means to stop said feed means when a predetermined weight is reached.

6. The machine of claim 5 in which there is a switch secured to the frame adjacent each outer end of said outer tracks, a switch element on said switch adapted to close said switch when pressed into contact, and means on each said carriage to depress said element when said carriage is entirely on said outer track and the other carriage is in weighing position, said switch being adapted to then actuate said feed mechanism.

7. A machine for filling and weighing a container supported by one of two carriages while simultaneously a filled container supported by the other carriage is being replaced by an empty container and in which said carriages may then be shifted, so that the first-named container can be replaced with an empty container while the empty container just placed on the other carriage is being filled and weighed, comprising; a main frame; a balance supported by said frame; a central carriage track, secured to said balance and swingable therewith and adapted to support a carriage in weighing position; two fixed carriage tracks secured to said main frame colinearly on either side of said central track; and a pair of container-supporting carriages movable along said tracks, joined pivotally in tandem so that at one time only one may rest wholly on said central track.

8. The machine claimed in claim 7 in which the carriages are supported on rollers having a V-groove, and in which the central track includes a knife edge adjacent each end on which the apexes of said groove rest when in weighing position, so that said apexes and said knife edges become the load pivot points of said carriages.

9. The machine claimed in claim 8 in which the height of the knife edges and the depth of the grooves in the rollers are substantially equal, so that there is no substantial vertical movement of the carriages when said rollers slide along said track and over said knife edges.

ROBERT B. BROWN.

REFERENCES CITED

The following references are of record in the file of this patent:

UNITED STATES PATENTS

| Number | Name | Date |
|---|---|---|
| 1,007,358 | Joplin | Oct. 31, 1911 |
| 1,856,904 | Campbell | May 3, 1932 |
| 1,902,512 | Mehl | Mar. 21, 1933 |
| 2,102,317 | Gwinn | Dec. 14, 1937 |